Patented June 13, 1939

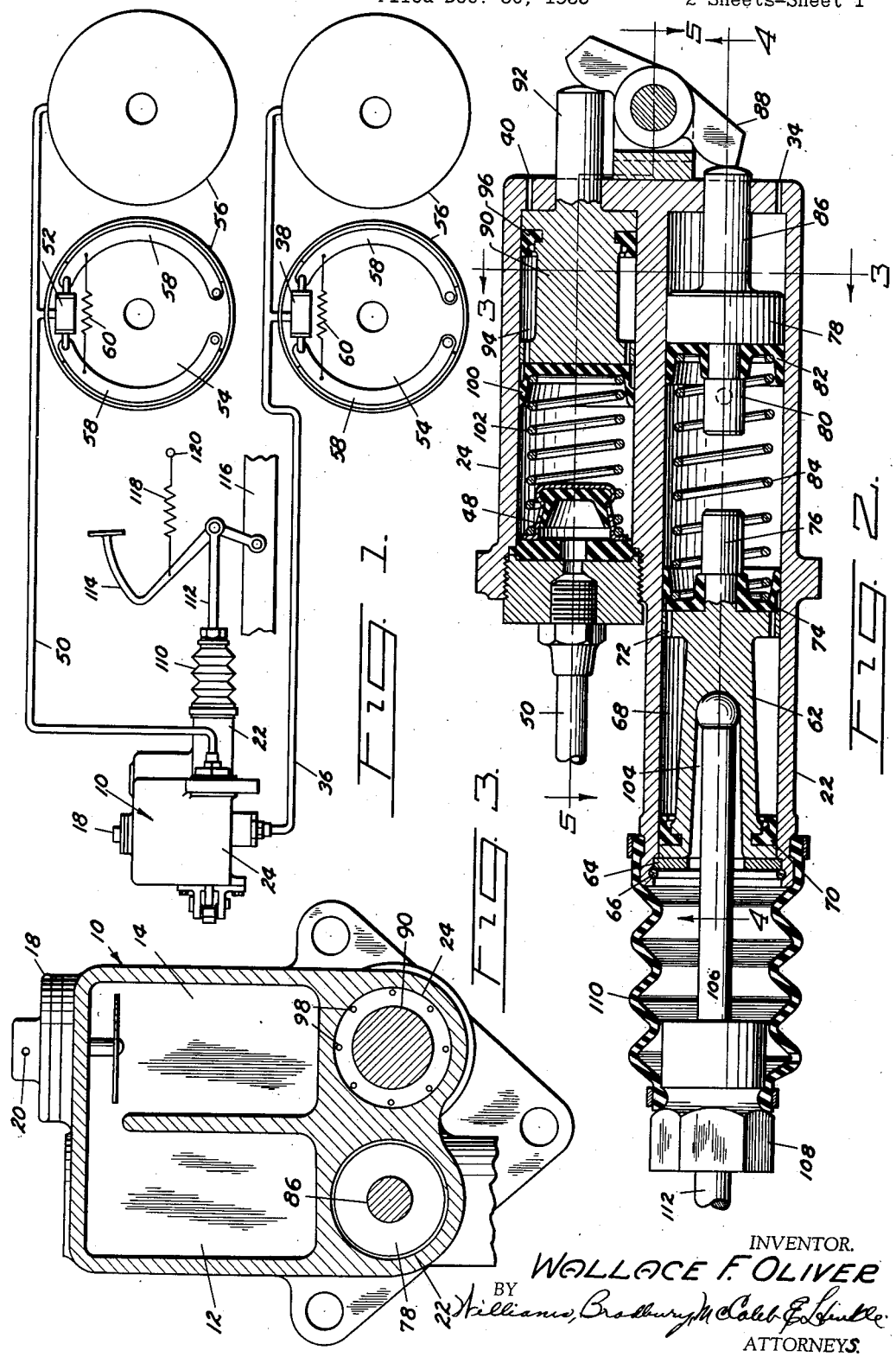

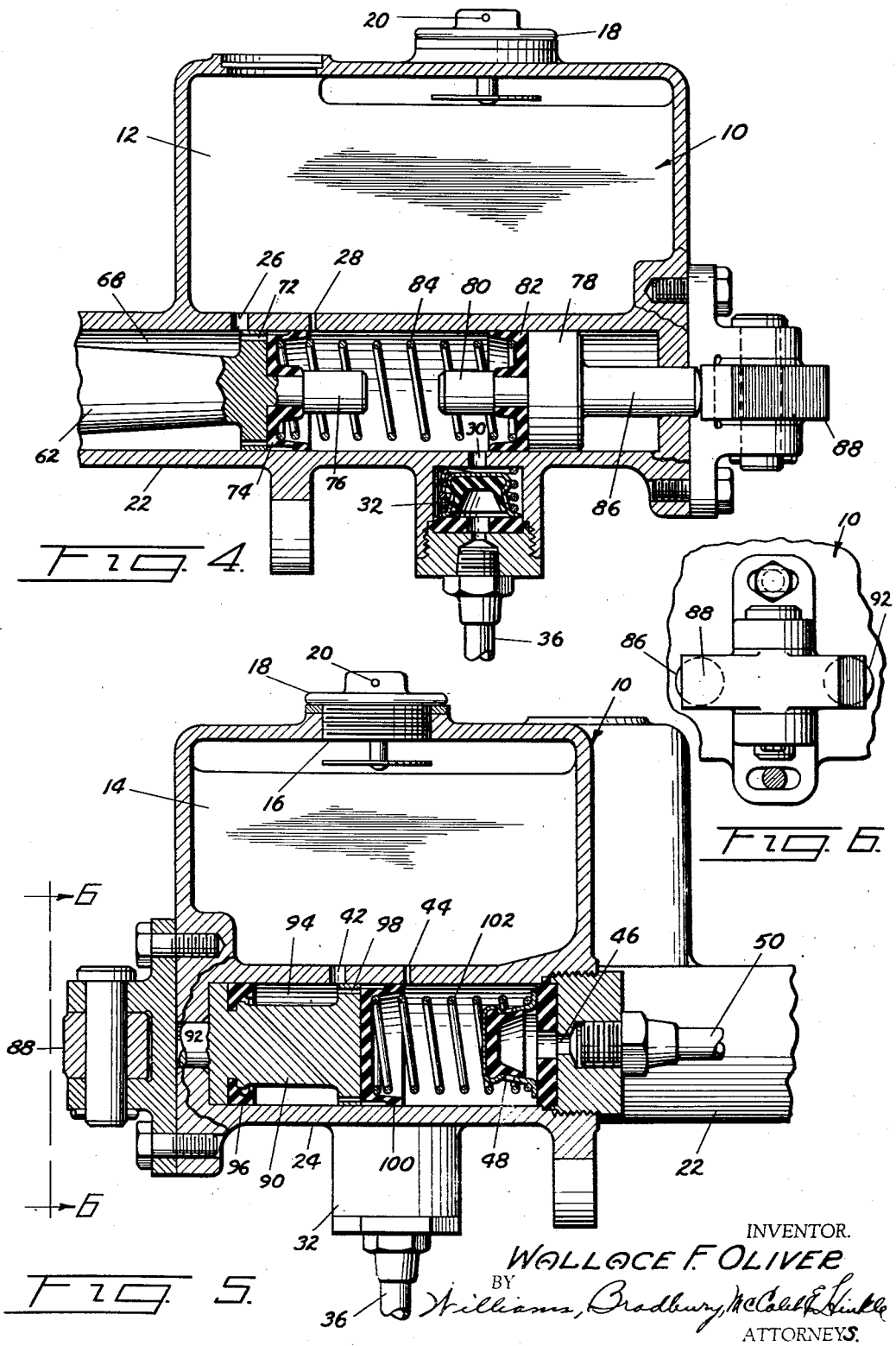

2,162,114

UNITED STATES PATENT OFFICE 2,162,114

FLUID PRESSURE BRAKING SYSTEM

Wallace F. Oliver, Detroit, Mich., assignor to Hydraulic Brake Company, Detroit, Mich., a corporation of California Application December 30, 1935, Serial No. 56,620

11 Claims. (Cl. 60—54.5)

This invention relates to braking systems, and more particularly to fluid pressure braking systems for motor vehicles.

The invention comprehends a duplex fluid braking system for a motor vehicle, one for actuating the brakes associated with the front wheels of the vehicle and the other for actuating the brakes associated with the rear wheels of the vehicle, and means for actuating the two systems concomitantly.

An object of the invention is to provide a duplex fluid pressure braking system having means for equalizing pressures in the systems.

Another object of the invention is to provide a duplex braking system having a single actuating means.

Another object of the invention is to provide two separate braking systems including a fluid pressure producing device having two cylinders with a piston movable in each of the cylinders, fluid pressure actuated motors operatively connected to each cylinder, friction elements actuated by each of the motors, and a single operating means for actuating the piston so as to produce equalizing pressures in the separate systems and to effectively operate one of the systems in the event of failure of the other system.

Other objects of the invention will appear from the following description taken in connection with the drawings forming a part of this specification, and in which, Fig. 1 is a schematic view of a duplex fluid pressure braking system embodying the invention;

Fig. 2 is a longitudinal sectional view of the fluid pressure producing device;

Fig. 3 is a cross-sectional view of the fluid pressure producing device substantially on line 3—3, Fig. 2;

Fig. 4 is a sectional view substantially on line 4—4, Fig. 2;

Fig. 5 is a sectional view substantially on line 5—5, Fig. 2; and

Fig. 6 is an end view of the fluid pressure producing device with parts broken away.

Referring to the drawings for more specific details of the invention, 10 represents a reservoir having two containers or compartments 12 and 14. The reservoir is provided with the conventional filling opening 16 which may be closed as by a plug 18 having openings 20 for venting the reservoir to the atmosphere.

Cylinders 22 and 24 are arranged in parallel relation to one another at the base of the reservoir. The cylinder 22 has ports 26 and 28 providing communications between the cylinder and the compartment 12 of the reservoir, a discharge port 30 controlled as by a two-way valve 32, and a vent 34 in the head of the cylinder for venting the cylinder to the atmosphere. A fluid pressure delivery pipe or conduit 36 connected to the valve 32 has branches connected respectively to fluid pressure actuated motors 38 for the actuation of the friction elements of the brakes.

Correspondingly, the cylinder 24 has an opening 40 for venting the cylinder to the atmosphere and ports 42 and 44 providing communications between the cylinder 24 and the compartment 14 of the reservoir, and a discharge port 46 controlled by a two-way valve 48. A fluid pressure delivery pipe or conduit 50 connected to the valve 48 has branches connected respectively to fluid pressure actuated motors 52 for the actuation of the friction elements of the brakes.

The motors 38 and 52 are arranged in pairs, one pair for actuating the brakes associated with the front wheels of a vehicle and the other pair for actuating the brakes associated with the rear wheels of the vehicle. The brakes may be of conventional type including a fixed support or backing plate 54, a rotatable drum 56 associated therewith, corresponding friction elements or shoes 58 pivoted on the backing plate, and a fluid pressure actuated motor corresponding to the motors 38 and 52 arranged on the backing plate and operative to move the shoes 58 into engagement with the drum 56 against the resistance of a retractile spring 60 connecting the shoes.

A piston 62 reciprocable in the cylinder 22 is held against displacement by a washer 64 seated on an annular shoulder in the open end of the cylinder and secured in position by a retaining ring 66 seated in a continuous groove in the wall of the cylinder. The body of the piston has a reduced portion providing in conjunction with the wall of the cylinder an annular chamber 68 communicating with the compartment 12 of the reservoir 10 by way of the port 26. Fitted in a circumferential groove in the skirt of the piston is a leak-proof washer 70 providing against seepage of fluid from the cylinder past the piston, and the head of the piston has a plurality of spaced ports 72 providing communications between the annular chamber 48 and that portion of the cylinder forward of the piston. A collapsible leak-proof cup 74 on the head of the piston controls the ports 72, and this cup has a concentric flange embracing a pin 76 protruding concentrically from the head of the piston.

A piston 78 reciprocable in the cylinder 22, in oppositely disposed relation to the piston 62, has on its head a concentric pin 80 and a leak-proof cup 82 having a concentric flange embracing the pin, and interposed between the cups 74 and 82 is a spring 84 for returning the piston 72 to its retracted position. The piston 78 has on its back a concentric stem 86 extending through an opening in the head of the cylinder and engaging one end of a rocker arm 88 pivoted on a shiftable bracket, which may be secured in any desired position.

A piston 90 reciprocable in the cylinder 24 has a concentric stem 92 extending through an opening in the cylinder and engaging the other end of the rocker arm 88. This piston has a reduced body portion providing in conjunction with the wall of the cylinder an annular chamber 94 communicating with the compartment 14 of the reservoir 10 by way of the port 42. The skirt of the piston has thereon a leak-proof washer 96 providing against seepage of the fluid from the cylinder past the piston; and the head of the piston has spaced ports 98 providing communications between the annular chamber 94 and that portion of the cylinder forward of the piston. A collapsible leak-proof cup 100 seated on the head of the piston controls the port 98, and a spring 102 interposed between the cup 100 and the two-way valve 48 serves to retain the cup and valve against displacement and also to return the piston to its retracted position.

The piston 62 has in its back a recess 104 for the reception of one end of a thrust pin 106, on the other end of which is a coupling 108 connected as by a flexible boot 110 to the open end of the cylinder 32 for the exclusion of dust and other foreign substances, and a rod 112 connects the coupling 108 to a foot pedal lever 114 pivotally mounted on a fixed support 116 and connected by a retractile spring 118 to a fixed support 120.

Because of the shiftability of the bracket on which the rocker arm 88 is pivoted, the movement of the pistons 78 and 90 may be regulated to vary the pressures produced in the cylinders 22 and 24, which variation may be found desirable in providing proper braking relation between the brakes associated with the front wheels and those associated with the rear wheels of the vehicle.

In a normal operation, upon depressing the foot pedal lever 114 force is transmitted therefrom through the rod 112 and thrust pin 106 to the piston 62 resulting in moving the piston on its compression stroke. During the initial movement of the piston on its compression stroke, the cup 74 on the head thereof closes the port 28, and further movement of the piston imposes pressure on the fluid in that portion of the cylinder 22 forward of the piston 62, resulting in displacement of fluid from the cylinder through the port 30, past the two-way valve 32 and through the fluid pressure delivery pipe 36 into the fluid pressure actuated motors 38, causing energization of the motors with the resultant actuation of the friction elements of the brakes against the resistance of the retractile springs.

Concomitant with this operation, the pressure on the fluid in that portion of the cylinder 22 forward of the piston 62 imposes pressure on the piston 78, resulting in movement of this piston on its compression stroke. As this piston moves on its compression stroke force is transmitted through the rod 86 to the rocker arm 88 and from the rocker arm to the rod 92 of the piston 90 in the cylinder 24, resulting in movement of the piston 90 on its compression stroke. During the initial movement of the piston 90 on its compression stroke, the cup 100 on the head thereof closes the port 44, and as the piston advances pressure is imposed on the fluid in that portion of the cylinder 24 forward of the piston resulting in displacement of fluid from the cylinder past the two-way valve 48, through the discharge port 46 and fluid pressure delivery pipe 50 into the fluid pressure actuated motors 52, causing energization of the motors with the resultant actuation of the friction elements of the brakes against the resistance of the retractile springs.

Upon release of the foot pedal lever 114 it is returned to its normal position under the influence of the retractile spring 118, and as it returns to its normal position the rod 112 and thrust pin 106 are retracted resulting in release of the piston 62. Upon release of this piston it is returned to its retracted position under the influence of retractile spring 84, and as it returns pressure on the fluid in the cylinders 22 and 24 is released, resulting in return of the pistons 78 and 90 to their retracted positions under the influence of the spring 102.

As the pistons 62 and 90 return to their retracted positions, partial vacuums are created in those portions of the respective cylinders 22 and 24 forward of the pistons, resulting in drawing fluid from the containers 12 and 14 of the reservoir supplying the respective cylinders. During this period fluid is returning to the respective cylinders from the fluid pressure actuated motors 38 and 52, and, should the cylinders receive a quantity of fluid in excess of that required to completely fill the cylinders, such excess is returned to the containers by way of ports 28 and 44.

Under abnormal operating conditions, as, for example, should the cylinder 22 become inoperative for producing pressure due to loss of fluid caused by breakage or rupture of the fluid pressure delivery pipe 36, or the fluid pressure actuated motors connected thereto, upon depressing the foot pedal lever 114 the piston 62 is moved on its compression stroke, and after advancing approximately one-half of its stroke the pin 76 on the head thereof abuts the pin 80 on the head of the piston 78, after which the pistons 62 and 78 move together. As the piston 78 moves on its compression stroke, force is transmitted through the rod 86 and the rocker arm 88 to the rod 92 of the piston 90, causing movement of this piston on its compression stroke with the resultant displacement of fluid from the cylinder 24 past the two-way valve 48, through the port 46 and the fluid pressure delivery pipe 50 into the motors 52, causing energization of the motors with the resultant actuation of the friction elements of the brakes.

As a further example, should the cylinder 24 become ineffective for producing pressure due to any cause, such as leakage or breakage, the operation of the brakes connected to the cylinder 22 is in no way effected because, due to a differential of pressures in the cylinders 22 and 24, the piston 78 is advanced to its maximum allowable during the compression stroke of the piston 62, and thereafter fluid is displaced from the cylinder 22 to actuate the brakes as hereinabove described.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,

1. A fluid pressure producing device comprising a pair of cylinders, a pair of opposed pistons adapted for independent reciprocable movement and operative contact in one of the cylinders, a piston reciprocable in the other cylinder, mechanical means operatively connecting last said piston to one of the opposed pistons, and means for actuating the other opposed piston.

2. A fluid pressure producing device comprising a pair of cylinders, a pair of opposed pistons adapted for independent reciprocable movement and operative contact in one of the cylinders, a piston reciprocable in the other cylinder, a mechanical member operatively connecting last said piston to one of the two other pistons, and means for actuating the remaining piston.

3. A fluid pressure producing device comprising a pair of cylinders arranged in parallel relation to one another, a separate fluid outlet for each cylinder, a pair of opposed pistons reciprocable in one of the cylinders, a single piston reciprocable in the other cylinder and constituting the sole means for creating fluid pressure therein, a rocker arm connected between two of the pistons, and means for actuating the remaining piston.

4. A fluid pressure producing device comprising a pair of cylinders arranged in parallel relation to one another, a separate fluid outlet for each cylinder, a pair of opposed pistons reciprocable in one of the cylinders, a rod for one of the opposed pistons, a single piston reciprocable in the other cylinder and constituting the sole means for creating fluid pressure therein, a rod for the last-mentioned piston, a rocker arm engaging the rods, and manual means for actuating one of the opposed pistons.

5. A fluid pressure producing device comprising a pair of cylinders arranged in parallel relation to one another, a piston reciprocable in one of the cylinders having a projection, means for actuating the piston, a reciprocable piston arranged in oppositely disposed relation to the first-mentioned piston having a projection for cooperation with the projection on the first-mentioned piston and a rod on its back, a piston reciprocable in the other cylinder having a rod, and a rocker arm engaging the rods.

6. A fluid pressure producing device comprising a reservoir having two compartments, a pair of cylinders arranged in parallelism each communicating with a different compartment, a pair of opposed pistons in one of the cylinders, a projection on the head of each of the opposed pistons, a spring interposed between the pistons, actuating means for one of the pistons, a rod on the back of the other piston, a piston reciprocable in the other piston, a rod on the back of the last-mentioned piston, and a rocker arm engaging the rods.

7. A fluid pressure producing device comprising a pair of cylinders, a pair of opposed pistons adapted for independent reciprocable movement and operative contact in one of the cylinders, a piston reciprocable in the other cylinder, mechanical means connecting the last named piston to one of the other pistons to vary the pressures produced in the cylinders, and means for actuating the remaining piston.

8. A fluid pressure producing device comprising a pair of cylinders, a separate fluid outlet for each cylinder, a pair of pistons reciprocable in one of the cylinders, a single piston reciprocable in the other cylinder and constituting the sole means for creating fluid pressure therein, an adjustable rocker arm connected between two of the pistons, and means for actuating the remaining piston.

9. A fluid pressure producing device comprising a pair of cylinders arranged in parallelism, a separate fluid outlet for each cylinder, a pair of opposed pistons reciprocable in one of the cylinders, a rod for one of the opposed pistons, a single piston reciprocable in the other cylinder and constituting the sole means for creating fluid pressure therein, a rod for the last-mentioned piston, a shiftable rocker arm engaging the rods, and means for actuating one the opposed pistons.

10. In a braking system, a fluid pressure producing device comprising a reservoir having two compartments, a cylinder communicating with each compartment, a separate fluid outlet for each cylinder, a pair of opposed pistons reciprocable in one of the cylinders, mechanical means for actuating one of the opposed pistons, a rod on the back of the other opposed piston, a single piston reciprocable in the other cylinder and constituting the sole means for creating fluid pressure therein, a rod on the back of the last-mentioned piston, a rocker arm mounted between and engaging the rods, and fluid pressure actuated motors connected to each of the cylinders for the actuation of friction elements.

11. In a braking system, a fluid pressure producing device including a reservoir having two compartments, a pair of cylinders arranged in parallelism each communicating with a different compartment, a separate fluid outlet for each cylinder, a pair of opposed pistons reciprocable in one of the cylinders, a single piston reciprocable in the other cylinder and constituting the sole means for creating fluid pressure therein, means connecting the last-named piston to one of the opposed pistons for concomitant movement, mechanical means for actuating the other opposed piston, and fluid pressure actuated motors connected to each of the cylinders for the actuation of friction elements.

WALLACE F. OLIVER.